Dec. 7, 1954

L. E. BURNETT 2,696,276

GREASE FITTING

Filed July 26, 1951

INVENTOR.
Loda E. Burnett
BY Victor J. Evans & Co.

ATTORNEYS

United States Patent Office 2,696,276
Patented Dec. 7, 1954

2,696,276

GREASE FITTING

Loda E. Burnett, Lawton, Okla.

Application July 26, 1951, Serial No. 238,717

1 Claim. (Cl. 184—1)

This invention relates to a grease fitting or cup, which can be used with Alemite or any standard grease gun for the purpose of connecting a grease gun to a bearing or the like and forcing grease into and greasing bearings, and in particular a sleeve or cap having a ball contained therein, with an internal threaded opening for receiving a nipple of a grease gun in one end and with a flange extended from the other end and positioned to receive the outer race or housing of a ball bearing, wherein when a grease gun attached to the fitting or cap is operated the ball contained therein closes the shaft hole in the inner race or cone of the bearing, whereby an annular film of grease is forced between the races of the bearing.

The purpose of this invention is to provide a grease fitting adapted to be used in combination with a grease gun through which grease is injected directly to balls or rollers between the inner and outer races of bearings, wherein old grease foreign matter etc. is forced forward under pressure out the opposite side of the bearing, cleaning and regreasing the bearing in one operation.

In the conventional type of grease gun fitting it is difficult to hold the connection or nipple of the gun so that the grease is injected directly into the balls or rollers between the races of a bearing and consequently, there is considerable waste of grease when applying grease under pressure to the bearings. This fitting substantially eliminates escaping grease from being wasted around the sides of the bearing. With this thought in mind this invention contemplates a fitting having a cylindrical body in the form of a cup, with a threaded opening in one end to receive a gun connection, and a projection or circular flange extended from the opposite or open end for frictional engagement with the outer shell or race of a bearing. A seating ball is provided in the cylinder of the cap for the purpose of closing the shaft opening in the inner portion or cone of the bearing, if the bearing is being greased while dismounted from the shaft of the machine. The bearings may be greased while on the machine shaft if desirable, in which case the seating ball does not come into play, being held higher in the cylinder by the shaft of the machine but at the same time letting the grease progress forward around the seating ball and into the bearing in the normal way, thus offering the option of greasing the bearings while mounted on the machine shaft or dismounted.

The object of this invention is therefore, to provide means for forming a fitting or grease cup having a grease gun connection at one end and the opposite end adapted to frictionally engage the outer surface of a bearing and a seating ball to frictionally engage the opening in the center portion or cone of bearing.

Another object of this invention is to provide an improved grease gun fitting that may be installed between a grease gun and a bearing, without substantially changing the gun or bearing.

A further object of this invention is to provide an improved fitting for applying grease under pressure to the type of bearings used on washing machines or other machines which are in contact with water and consequently need frequent greasing, which may be done while mounted on the machine shaft or dismounted.

With these and other objects and advantages in view, the invention embodies a cylindrical body member having an open end with a peripheral flange formed therein and a closed end with a threaded opening therein and a seating ball positioned between the open and closed ends and retained in position by a retainer flange built therein, which is upset or peened over in sections to retain the ball in the cylinder and give the proper spacing.

Other features and advantages of the invention will appear from the following description taken in connection with the drawing, wherein.

Figure 1:
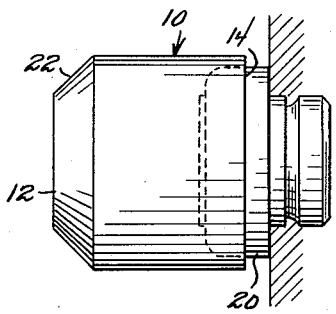
Figure 1 is a side elevational view illustrating the fitting and showing the device positioned over the outer edge of a bearing.
Figure 2:
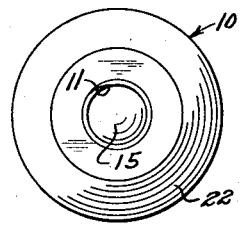
Figure 2 is an end view looking toward the threaded end of the fitting.
Figure 3:
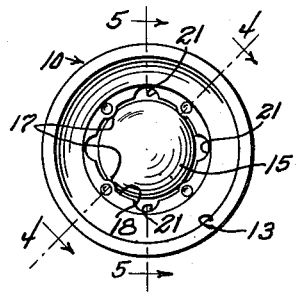
Figure 3 is an end elevational view looking into the open end of the fitting and showing the ball and retainer flange therein.
Figure 4:
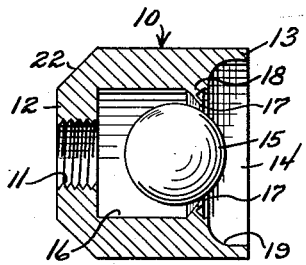
Figure 4 is a longitudinal section through the fitting, taken on the line 4—4 of Figure 3, showing the ball in position between the punched portions of the retainer flange.
Figure 5:
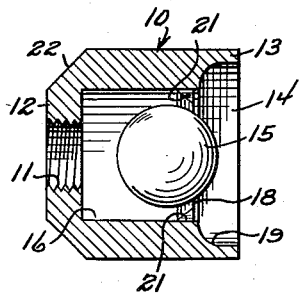
Figure 5 is a section taken through the fitting on the line 5—5 of Figure 3, showing the grease channels through the retainer flange to allow an even passage of grease to the bearing.

Referring now to the drawing wherein like reference characters denote corresponding parts the improved grease fitting of this invention includes a body 10 having a threaded opening 11 in a closed end 12 and having a peripheral flange 13, in an open end 14, at the opposite end of the fitting, and a ball 15, that is retained in an open chamber 16 in the fitting by projections 17 which extend inward slightly, being swedged from an annular shoulder or retainer flange 18, with a center punch or the like.

The retainer flange 18 is provided with recesses 21 through which the grease escapes into the races of the bearing when grease is forced forward, forcing the seating ball 15 forward and closing the shaft opening in the cone or center of the bearing, if the bearing is being greased while dismounted from machine, otherwise the shafting hole is already closed and the seating ball is retained higher in the chamber in a dormant position by the ordinary projections of the shafts through the average bearing the difference between the inside and outside diameters of the cylinder and the ball respectively being ample to allow easy passage of the grease around the ball and into the bearing in all positions.

The outer end 22 of the body member may be conical shaped or beveled in cross section.

The peripheral flange 13, which is provided with an arcuate inner surface, as indicated by the reference numeral 19 is formed so that the outer edge of a bearing 20 nests therein to form an outside seal.

With the parts arranged in this manner and the fitting or cap placed over a bearing, the cap tends to form a seal around the shell of a bearing while the seating ball 15 closes the inner portion of the bearing thus sealing all the portions of the bearing except the ball bearing space between the races, thus forcing the grease into and through the annular area between the inner and outer races of the bearing.

Although this fitting is particularly adapted for greasing the upper wringer roll bearings of washing machines, it will be understood that it is also adapted for use on bearings used on any other type or design of machine, and may also be used for other purposes.

It will be understood that modifications may be made in the design and arrangements of the parts without departing from the spirit of the invention.

What is claimed is:

In a fitting for pressure grease guns, the combination which comprises a cup having an extended peripheral flange on the outer end, a threaded opening in the closed end and having a shoulder spaced from the outer end, said cup having an open chamber in the intermediate part thereof, and a ball freely positioned in the said open chamber and retained therein by spaced projections extended inwardly from the shoulder of the body, said shoulder having spaced open areas between said projections.

(References on following page)

References Cited in the file of this patent

UNITED STATES PATENTS

| Number | Name | Date |
|---|---|---|
| 1,628,833 | Frank | May 17, 1927 |
| 1,684,743 | Reilly | Sept. 18, 1928 |
| 1,715,335 | Cocks | May 28, 1929 |
| 2,055,603 | Dodge | Sept. 29, 1936 |
| 2,280,533 | Norman | Apr. 21, 1942 |
| 2,286,536 | Griffith | June 16, 1942 |
| 2,372,456 | Stewart | Mar. 27, 1945 |

FOREIGN PATENTS

| Number | Country | Date |
|---|---|---|
| 467,597 | Great Britain | June 21, 1937 |
| 927,618 | France | May 5, 1947 |